United States Patent [19]

Stumpp et al.

[11] 4,392,352

[45] Jul. 12, 1983

[54] APPARATUS FOR REGULATING TURBOCHARGERS AND INTERNAL COMBUSTION ENGINES ASSOCIATED THEREWITH

[75] Inventors: Gerhard Stumpp, Stuttgart; Wolf Wessel, Oberriexingen, both of Fed. Rep. of Germany

[73] Assignee: Robert Bosch GmbH, Stuttgart, Fed. Rep. of Germany

[21] Appl. No.: 276,758

[22] Filed: Jun. 24, 1981

Related U.S. Application Data

[62] Division of Ser. No. 40,795, May 21, 1979, abandoned.

[30] Foreign Application Priority Data

May 27, 1978 [DE] Fed. Rep. of Germany ....... 2823255

[51] Int. Cl.³ .............................................. F02B 37/12
[52] U.S. Cl. ..................................................... 60/602
[58] Field of Search ................. 60/600, 601, 602, 603, 60/611; 73/861.63; 415/17; 417/43, 46, 47

[56] References Cited

U.S. PATENT DOCUMENTS

| | | | |
|---|---|---|---|
| 1,616,450 | 2/1927 | Huff | 417/43 |
| 2,508,311 | 5/1950 | Udale | 60/601 |
| 2,558,968 | 7/1951 | Lee | 60/600 |
| 3,568,435 | 3/1971 | May | 60/611 X |
| 3,630,496 | 12/1971 | Hurst | 415/17 X |
| 3,925,989 | 12/1975 | Pustelnik | 60/602 |

*Primary Examiner*—Michael Koczo
*Attorney, Agent, or Firm*—Edwin E. Greigg

[57] ABSTRACT

A method and an apparatus are proposed for regulating and attaining an anti-overload means in turbochargers and in internal combustion engines equipped therewith, serving in cost-favorable embodiment both in Otto (gasoline) engines and in Diesel engines to limit the air throughput of the engine in accordance with the engine speed and to provide that neither the turbocharger, as a result of exceeding its limit rpm, nor the engine can be endangered if the engine exceeds the permissible compression and combustion pressure. In summary, the intent is to attain a favorable adjustment of the exhaust turbocharger over the entire rpm range of the internal combustion engine. To this end, the exhaust gas quantity delivered to the exhaust turbocharger is controlled in accordance with the throughput, that is, in accordance with the air quantity delivered to the engine, with the aid of a bypass line. The air quantity delivered by way of the compression area of the exhaust turbocharger of the engine is detected ahead of the exhaust turbocharger, either with the aid of a direct air flow rate meter, or by means of a throttle restrictor and the detection of the underpressure being created at that point.

2 Claims, 4 Drawing Figures

APPARATUS FOR REGULATING TURBOCHARGERS AND INTERNAL COMBUSTION ENGINES ASSOCIATED THEREWITH

This application is a divisional application of application Ser. No. 40,795 filed on May 21, 1979, now abandoned.

BACKGROUND OF THE INVENTION

The invention relates to a method and an apparatus for the regulation of turbochargers and internal combustion engines associated with such turbochargers, all of which are presented hereinafter and finally claimed. It is known to dispose the turbine part of an exhaust turbocharger in the exhaust tube of an internal combustion engine, the charging or compression area of which is oriented toward the intake manifold of the internal combustion engine in such a manner that the engine can be supplied with the required combustion air at an increased charge pressure, so that there is a general increase in output of the engine as a result of such charging.

In such an arrangement, the charging of the engine is dependent on the turbocharger rpm at a particular time, which results in the following problems. It is possible that the turbocharger may be endangered because it may be supplied with excess energy as a result of high exhaust gas temperatures, and thus exceed its limit rpm. The engine as well, which may preferably be embodied as a Diesel engine, is endangered if as a result of the turbocharger there is such a high air charging that the permissible compression and combustion pressure in the cylinders is exceeded. There are difficulties in general, over the entire rpm range of the engine, in attaining a favorable adjustment of the behavior of the exhaust turbocharger, particularly in an Otto engine, where in order to attain sufficiently high torque at low rpm a relatively small exhaust turbocharger must be used. In that event, the exhaust turbocharger supplies too much air at high engine rpm, so that the torque of the engine at high rpm is too high and it is also to be understood that the rpm of the exhaust turbocharger and the exhaust gas temperature can become impermissibly high.

The same is basically true in providing a Diesel engine with an exhaust turbocharger, which should supply sufficient air for sufficient torque even at low engine rpm, however with such a device an undesirably large air quantity at high rpm is produced. Although it is possible in a Diesel engine to determine the torque behavior of the engine by limiting the fuel quantity, still the rpm of the exhaust turbocharger can become impermissibly high. In addition, the high combustion pressure in the combustion chamber of the engine requires a stable engine structure. It is desirable in general to limit the air throughput in such a way that in a Diesel engine the fuel burns with little smoke.

There is a known means of control of the exhaust gas delivery to an exhaust turbocharger by subdividing the exhaust tube ahead of the turbocharger turbine and forming a so-called bypass line, which, as may be desired, diverts a portion of the exhaust quantity from passing through the turbine of the exhaust turbocharger. To this end, in a known manner, a bypass valve controlled by the charge pressure of the compressor part of the exhaust turbocharger can be disposed at the branching point of the bypass line. This bypass valve opens either fully or partially under very high charge pressure and diverts certain exhaust gas quantities away from the turbine of the exhaust turbocharger, thus bypassing it. In so doing, however, there is the disadvantage that such a means of regulation does not rely on actual conditions, and in particular those of the rpm of the engine or the induced air quantity or the rpm of the turbocharger; in addition, external air pressure variations enter into the regulation and act as an interference factor.

OBJECT AND SUMMARY OF THE INVENTION

The method and apparatus in accordance with the invention have the advantage over the prior art that the chance of danger both to the turbocharger and to the associated internal combustion engine is eliminated with certainty, for the control of the exhaust gas delivery to the turbocharger relies either on the engine rpm directly in connection with a measurement of air quantity, or on the air quantity measurement alone, so that effective parameters of the engine are evaluated. Thus, it is possible to adapt the air throughput of the engine precisely to the desired course of the engine rpm and to attain a favorable adjustment of the exhaust turbocharger in all rpm ranges.

It is of particular advantage that as a result of using an air flow rate meter for the limitation of air throughput, the principle of exhaust gas feedback can also be maintained while preserving the desired air number $\lambda$ of the fuel-air mixture finally delivered to the engine.

It is furthermore advantageous that in a great many cases in internal combustion engines (a Diesel engine, for instance) there are already data relating to the air throughput or the engine rpm, some of them already in the form of electronic signals, so that the additional expense for providing the regulation loop which includes the exhaust turbocharger is small.

It is also advantageous that air pressure variations, depending on the type of the air flow rate meter enter into the regulation loop either only halfway (in the case of measurement apparatus functioning according to Bernoulli's Law) or not at all (in the case of a heating-wire air flow rate meter), if one relies on a measurement of air quantity.

By means of the features described in the dependent claims, advantageous further embodiments and improvements of the method disclosed in the first claim and of the apparatus appropriate to performing this method are possible.

It is of particular advantage for there to be a throttle restrictor disposed for the purpose of air quantity measurement in the intake manifold of the engine ahead of the turbocharger, whereby the underpressure being created at this point acts upon a control member in the form of a diaphragm underpressure regulator. By means of a simple connection via a rod, of the diaphragm with a distributor valve in the area of the branching off of the main exhaust tube and the bypass line, a sensitive regulation which also permits intermediate settings can be attained.

The invention will be better understood as well as further objects and advantages thereof become more apparent from the ensuing detailed description of preferred embodiments taken in conjunction with the drawings.

DESCRIPTION OF THE PREFERRED EMBODIMENTS

The basic concept of the present invention is to evaluate the air quantity induced by the engine/turbocharger system ahead of the turbocharger in the sense of controlling the exhaust gas quantity effectively delivered to the exhaust turbocharger.

Figure 1:
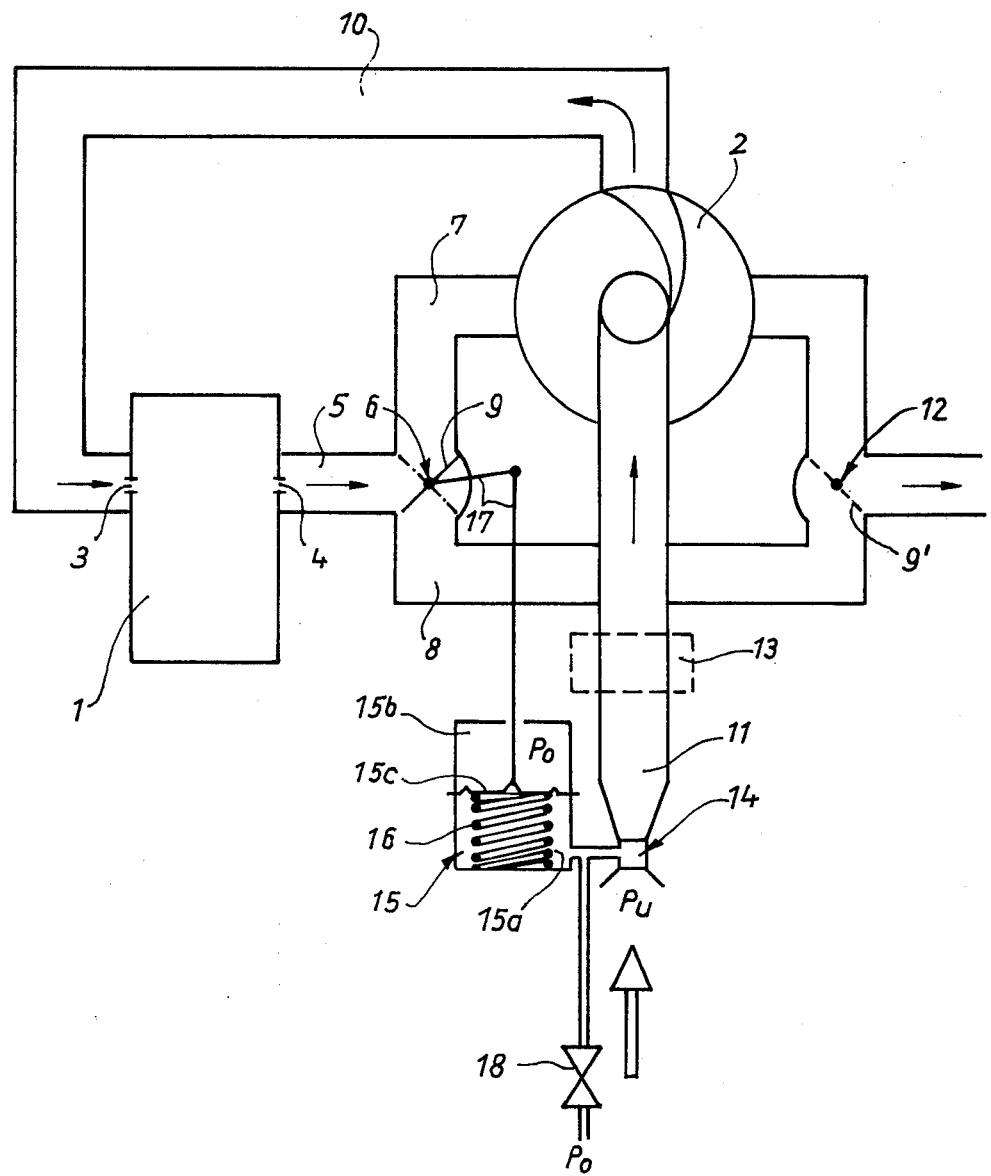
FIG. 1 is a schematic view of a first, simplified exemplary embodiment of the control of an exhaust turbocharger in accordance with the basic concept of the present invention.

In the first exemplary embodiment shown in FIG. 1, the air flow rate measurement is performed by disposing a throttle point in the intake manifold and, with the aid of an associated underpressure pickup, by controlling a distributor valve in the exhaust tube which is disposed at the point of intersection between the main exhaust line and the bypass line. In FIG. 1 the internal combustion engine, which is preferably a Diesel engine but may also be an Otto engine, is designated by reference numeral 1 and the turbocharger is identified as 2. The engine 1 has an air inlet indicated schematically at 3 and an exhaust gas outlet as at 4. The portion of the exhaust tube 5 connected with this outlet 4 divides at 6 to form a main exhaust line 7 and a bypass line 8. At this point, there is a distributor valve 9, which may be embodied as a rotary valve.

The air inlet 3 of the internal combustion engine 1 is formed via a pressure line 10 and the intake manifold 11 lying in front of the area where the turbocharger 2 is located. The exhaust lines 7 and 8 reunite behind a part of the turbine (not shown) of the turbocharger 2 at the point marked 12.

The combined regulator and anti-overload apparatus in accordance with the invention for an exhaust turbocharger in an internal combustion engine is particularly suitable for Diesel engines; naturally, however, it can also be used in Otto engines. Both the turbocharger 2 and the Diesel engine 1 are endangered either if too much energy is delivered to the turbocharger, i.e., if the rpm limit of the turbocharger is exceeded because of high exhaust gas temperature and high output of the engine, or if the turbocharger delivers such a high air charge to the engine that the permissible compression and combustion pressure is exceeded.

The invention is based on the concept that both high turbocharger rpm and a cylinder/piston overload are recognizable in a high flow of air induced and delivered to the Diesel engine 1. Thus, a throttle restrictor 14 is located in the intake manifold 11 of the engine, and insofar as possible in front of the air filter 13 and in any case in front of the area where the turbocharger 2 is located. The throttle restrictor 14 may be embodied, for instance, as a measurement aperture, or, as in the illustrated embodiment, as a Venturi nozzle because of the smaller pressure loss. The underpressure created at this throttle restrictor in accordance with the air throughput is detected as a standard for the induced air quantity and is delivered to an adjustment device or a control member 15, which is an underpressure regulator which in turn acts upon the previously mentioned distributor or exhaust valve 9. Thus, it is a matter of choice whether the exhaust flow is directed through the turbocharger 2 or past it into the bypass line 8. It will be appreciated that any desired intermediate settings are also possible.

In the exemplary embodiment shown, the distributor valve 9 is located ahead of the turbine of the turbocharger it is, however, also possible to place the distributor valve behind the turbocharger 2, for instance at point 12, at which the main exhaust line 7 and the bypass line 8 are brought back together again. The distributor valve shown at that point in broken lines is indicated as 9'. At this point, it is less endangered by temperature.

The control member 15 includes a work chamber 15a, which is separated from a chamber 15b vented to the atmosphere by a movable diaphragm 15c, which is prestressed by a spring 16 in such a direction that if the underpressure effect is not present, the distributor valve 9 is in the fully withdrawn position in which the entire exhaust flow is delivered to the turbocharger 2. To this end, the diaphragm 15c may be connected with the distributor valve 9 via a rod means indicated at 17.

If an underpressure comes about as the air flow in the intake manifold 11 increases, then the diaphragm 15c, prestressed by the spring, moves from its upper stop and delivers a quantity of exhaust gas to the bypass line 8 which becomes greater and greater, until an appropriate balance is attained. If a dangerous operational state is reached, the prestressing force of the spring is completely overcome, and the valve closes the opening to the main exhaust line 7, so that the valve is in the position indicated by the broken lines.

An abrupt shutoff of the turbocharger may be attained by using a soft spring (corresponding to a small spring constant), while a gradual shutoff of the turbocharger is achieved, as the air flow increases, by means of a stiffer spring (having a large spring constant).

In the drawing, the ambient atmospheric air pressure is marked $p_o$, and the underpressure arising at the throttle restrictor 14 is marked $p_u$.

At certain operational points, such as during an acceleration procedure or at certain rpm ranges, it may be desirable to make the anti-overload apparatus ineffective. This is possible by means of a ventilation valve which, as a matter of choice, may be placed in the underpressure line from the throttle restrictor 14 to the work chamber 15a, or may be attached to the work chamber 15a. This ventilation valve delivers the exterior atmospheric pressure $p_o$ to the work chamber. The ventilation valve 18 may be controlled electrically, hydraulically or pneumatically, and so that the operational parameters available at a particular time, which represent a standard for the desired operational points, are used for controlling the ventilation valve 18.

Figure 2:
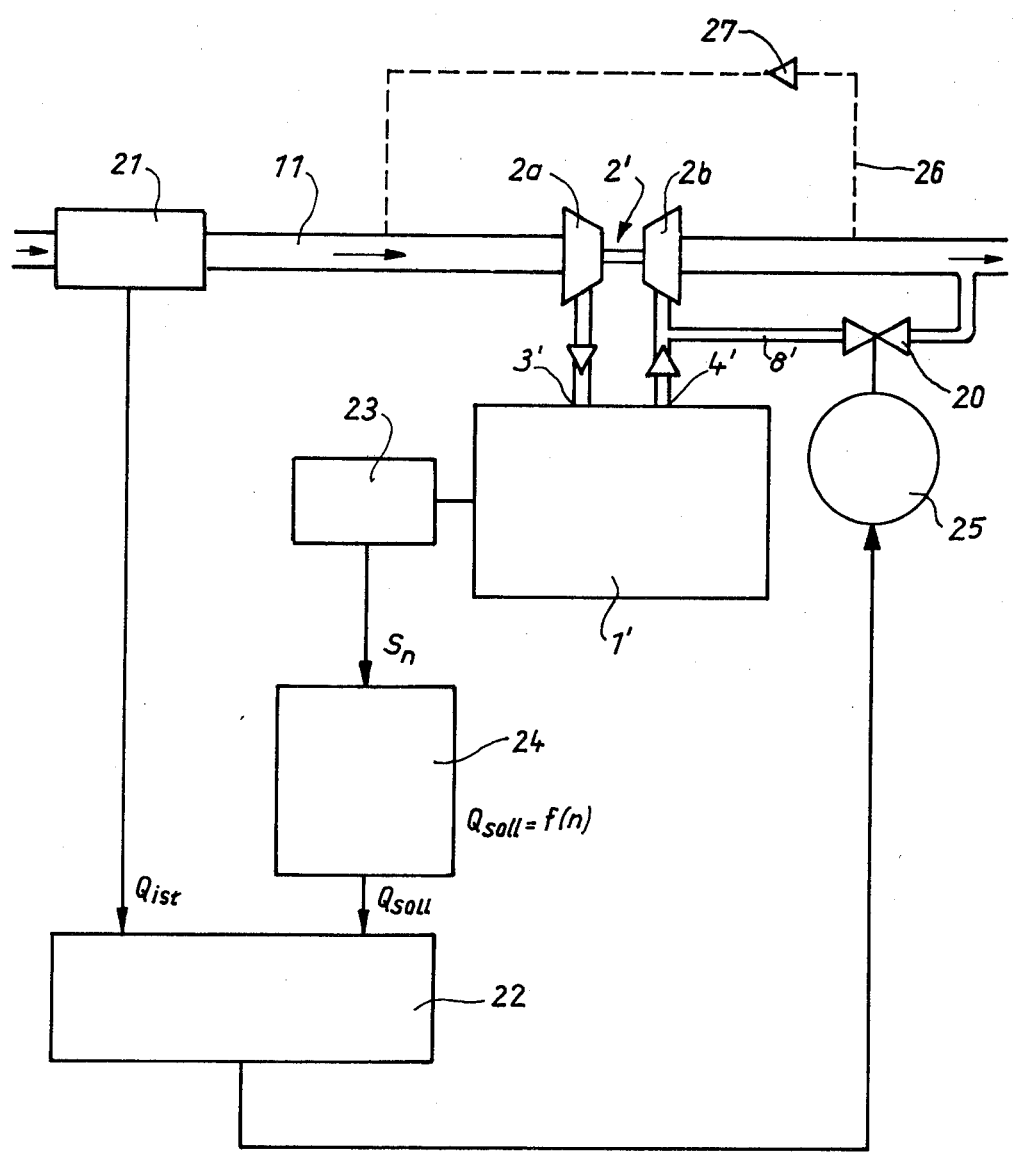
FIG. 2 is a second exemplary embodiment of the invention in which the engine rpm is also detected for the purpose of the control of the exhaust gas quantity delivered to the turbine of the exhaust turbocharger and, with a characteristic curve being formed, an air quantity set-point value is derived which is compared with a measured air quantity value and, via a regulator and a final control element, drives a valve in the bypass line.
Figure 3:
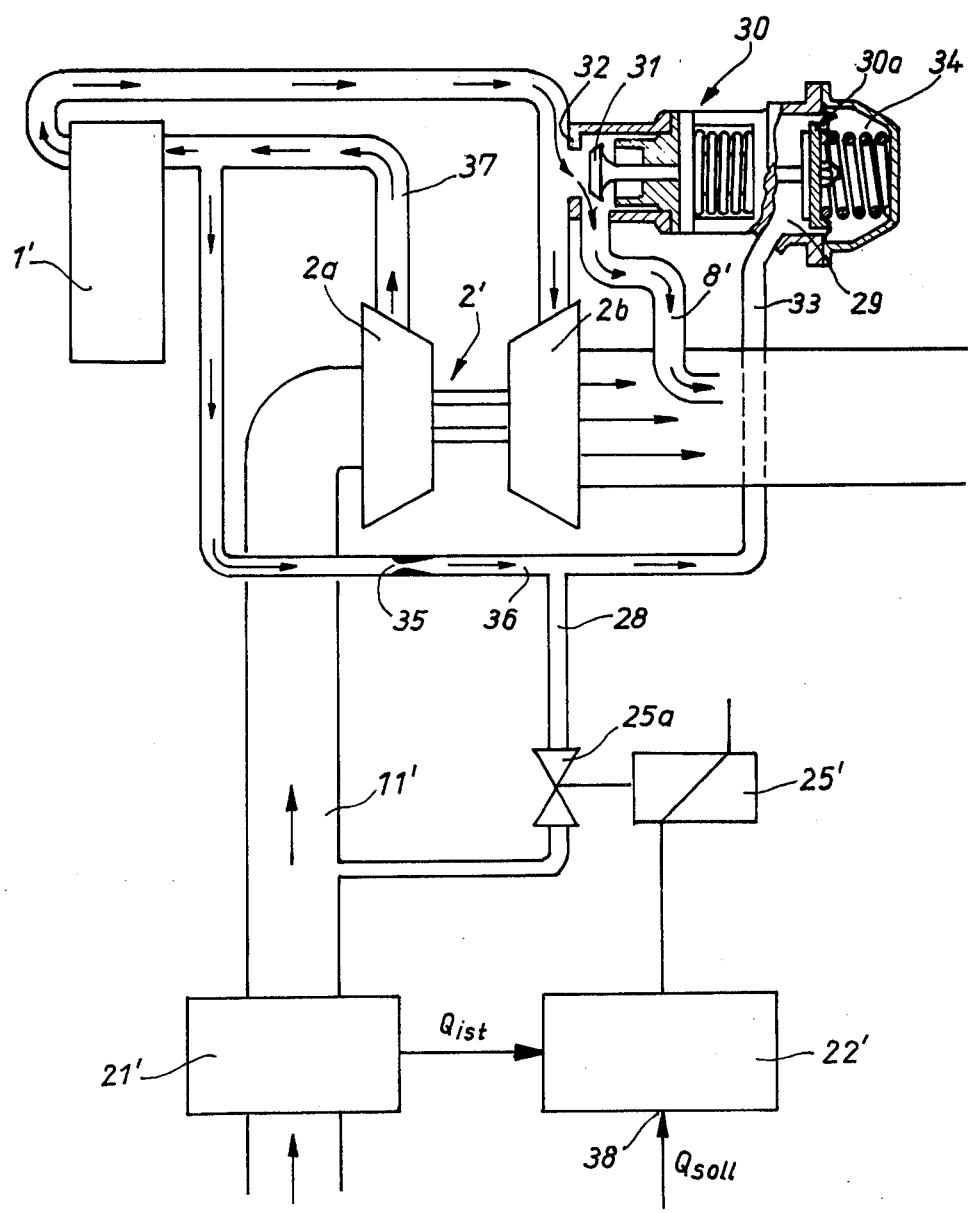
FIG. 3 shows still another embodiment of the invention for the control of an exhaust turbocharger in accordance with throughput, whereby the charge pressure is used as a working medium for the exhaust valve which determines the exhaust gas quantity in the bypass line, but where the charge pressure is controlled in accordance with air quantity.
Figure 4:
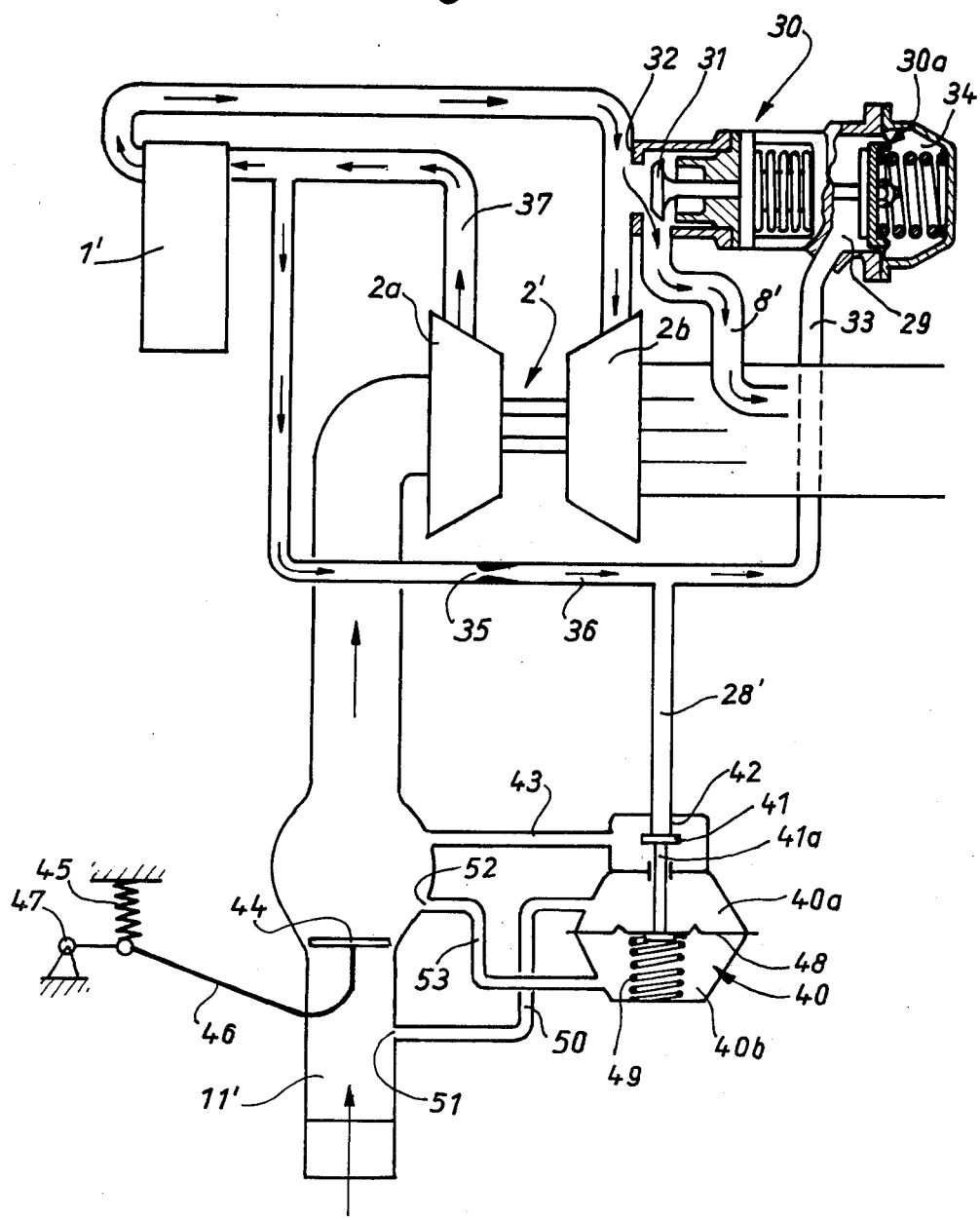
FIG. 4 is a variant of the embodiment of FIG. 3 which utilizes mechanical structural components.

It will be appreciated that the group comprising distributor valve 9, rod means 17 and underpressure regulator 15 may also be embodied as a unit, as an exhaust valve, as is appropriately shown in FIG. 2 by reference numeral 20 and in FIGS. 3 and 4 by reference numeral 30. In the exemplary embodiments of FIGS. 3 and 4, which will be discussed in detail below, the exhaust valve 30 has a valve member 31, which under appropriate direction lifts up from an associated valve seat 32 and thereby opens the bypass line 8' for the passage of the exhaust gases. The valve member 31 in this exhaust valve 30 is lifted from its seat by means of an overpressure delivered through the line 33; if the apparatus is to function as in the embodiment of FIG. 1, then the underpressure should be delivered at an appropriate point, such as to the work chamber 34.

In the exemplary embodiment of FIG. 2 to be described now, as well as in the exemplary embodiments of FIGS. 3 and 4 to follow, the same reference numerals are used for the same parts as in the embodiment of FIG. 1, with a prime added. An air flow rate meter 21 is disposed in the intake manifold 11' before the charge area 2a of the exhaust turbocharger 2'; this meter 21 measures an actual value $\dot{Q}_{ist}$ for the air quantity and delivers it to a subsequent, preferably electronic, regulator 22. The air flow rate meter may be, for example, a baffle plate air flow rate meter, wherein the signal for the induced air quantity $\dot{Q}_{ist}$ is derived from the rotary angle of the baffle plate or the baffle plate stroke.

In addition, the rpm of the engine 1' is measured with the aid of a suitable, preferably electronic apparatus which detects (by means, for example, of an inductive transducer) the passage of teeth of a gear wheel rotating synchronously with the main shaft of the engine. The rpm measurement apparatus 23 generates at its output a signal $S_n$ proportional to the rpm and delivers this signal to a subsequent characteristic curve generator 24, which furnishes a set-point signal for the air quantity which is derived from the engine rpm in accordance with the formula $\dot{Q}_{soll}=f(n)$. The set-point signal for air quantity $\dot{Q}_{soll}$ is also delivered to the regulator 22, which ascertains from the two input signals the regulatory deviation and delivers it to a servomotor or control element 25, which accordingly opens an exhaust valve 20 in the bypass line 8'. As long as the air quantity set-point value $\dot{Q}_{soll}$ is greater than the air quantity actual value $\dot{Q}_{ist}$, the exhaust valve 20 remains closed; however, as soon as $\dot{Q}_{ist}$ is greater than $\dot{Q}_{soll}$, the regulator 22 displaces the valve 20 until such time as $\dot{Q}_{ist}=\dot{Q}_{soll}$ is attained. In this exemplary embodiment as well of an engine having a regulated exhaust turbocharger, the bypass line 8' bypasses the turbine area 2b of the exhaust turbocharger; additionally, if desired, an exhaust gas feedback line 27 is also possible in accordance with the broken line 26.

If, in a simplified embodiment, the measurement of the engine rpm n and its conversion into an air quantity set-point value are omitted, this embodiment of FIG. 2 then approaches the regulator and anti-overload apparatus of FIG. 1, with the exception that an actual air flow rate meter which functions with a baffle plate is inserted as the means of air measurement and the regulator 22 is then set to a constant set-point value.

In the embodiment of FIG. 3, where the exhaust valve 30 has already been discussed in part, the control element 25' (in this embodiment, a control magnet) with an associated valve 25a does not directly actuate the exhaust valve which opens the bypass line 8' in the exhaust tube, but rather controls a pneumatic servomotor 30a, which is part of the exhaust valve 30, by means of a connection line 28 opened into the intake manifold 11' by the valve 25a. The work chamber 29 of this servomotor 30a communicates via a throttle 35 in a connecting line 36 with the pressure line 37 between the compression area 2a of the charger and the engine 1; that is, it communicates with the chamber downstream of the charger.

The valve 25a, via the lines 33, 28, ventilates the work chamber 29 of the pneumatic servomotor 30a toward the chamber between the air flow rate meter 21' and the charging area 2a of the exhaust turbocharger. It will be appreciated that this system is so adapted that when a given induced air quantity is reached, which arrives as a measurement value at the output of the air flow rate meter 21' (and as needed after comparison with an air quantity set-point value $\dot{Q}_{soll}$ delivered at 38), the control element 25' is controlled by the regulator 22' in a direction such that the ventilation valve 25a closes; thus it is possible for the compressed air quantity withdrawn from the line 37 behind the compressor 2a of the exhaust turbocharger and used solely as a working medium to develop a pressure in the work chamber 29 of the pneumatic servomotor 30a such that the valve member 31 is lifted from its seat and directs exhaust gas quantities to bypass the turbine of the turbocharger, until the air throughput is again limited to the predetermined value. This means that an internal combustion engine is obtained which, above the engine rpm at which the air throughput is limited, produces substantially constant output at a constant air number.

As already mentioned above in connection with FIG. 2, the rpm measurement apparatus 23, the characteristic curve generator 24 and the regulator preferably function with electronic parts, while the control element 25' if FIG. 3 may be a magnetic valve with an associated ventilation valve 25a.

The form of embodiment of FIG. 4 shows that an exhaust turbocharger regulated in this manner may also be produced relatively simply with purely mechanical means; to this end, a combined control valve 40 is provided which is also intended for ventilation of the line 36 which supplies the required compressed air to the work chamber 29 of the servomotor 30a and to this end has a valve member 41, which can lift from the seat 42 of the ventilation line 28', so that this line can ventilate, via a further line 43', into the space between the air flow rate meter and the charging area 2a. The air flow rate meter is shown as a spring-prestressed baffle plate 44; the prestressing spring is marked 45 and the stationary bearing pivot point of the baffle plate lever 46 is marked 47. The valve member 41 communicates via a push rod 41a with a diaphragm 48 which separates two work chambers 40a and 40b of the control valve 40 from one another. The diaphragm 48 is prestressed by a spring 49. The work chamber 40a communicates via a connecting line 50 with a control bore 51, which opens into the intake manifold 11' below a control bore 52 located in an extended portion of the intake manifold. The control bore 52 communicates via a line 53 with the lower work chamber 40b of the control valve 40. As long as the air throughput through the engine is below a certain value, as may be characterized, for example, by the middle position of the baffle plate 44 in the intake manifold 11' shown in FIG. 4, the work chamber 29 of the pneumatic servo motor 30a servomotor 30a is ventilated and the bypass line 8' is therefore closed; for the pressure in the work chamber 40a is greater than the pressure in the work chamber 40b and the added spring prestressing pressure. However, as soon as the baffle plate 44 of the air flow rate meter rises above the control bore 52, that is, is pressed further downstream in the flow direction of the induced air, then the same pressure prevails in the work chambers 40a and 40b, and the control valve 40 closes, so that the work chamber 29 is no longer ventilated via the lines 33, 36 and 28' and the exhaust valve opens, thus opening the bypass line 8'.

The foregoing relates to preferred embodiments of the invention, it being understood that other embodiments and variants thereof are possible within the spirit and scope of the invention, the latter being defined by the appended claims.

What is claimed and desired to be secured by Letters Patent of the United States is:

1. A regulator and anti-overload apparatus for turbochargers for use with an internal combustion engine comprising an air intake manifold, an exhaust tube, an exhaust turbocharger, said turbocharger including a turbine wheel and a compressor element, said turbine wheel being disposed in said exhaust tube of said engine and said compressor element of said turbocharger being disposed in said intake manifold for delivering combustion air to the engine at increased pressure, an exhaust bypass line that bypasses said turbocharger; said anti-overload apparatus further including an exhaust gas flow control means which in accordance with turbocharger-engine parameters controls flow of partial quantities of exhaust gas through said exhaust bypass line, an air flow rate meter which produces an output value dependent on the flow of air through the air intake manifold, an rpm meter which produces an output value dependent on the rpm of said internal combustion engine, a curve generator to which said output value of said rpm meter is delivered, said curve generator generating a set-point air quantity ($\dot{Q}_{soll}$) which corresponds to the particular engine rpm at that time, an electronic regulator having an input which input is connected to the output of said curve generator which delivers said generated set-point air quantity thereto and to the output of said air flow rate meter producing a control signal corresponding to a deviation of the output value of said air flow rate meter from said set-point, said electronic regulator producing an output which is connected to said exhaust gas flow control means for controlling partial quantities of exhaust gas through said exhaust bypass line.

2. An apparatus in accordance with claim 1, further wherein said exhaust gas flow control means includes an exhaust valve wherein said exhaust valve is a magnetic valve driven by the output of said electronic regulator.

* * * * *